Figure 1:
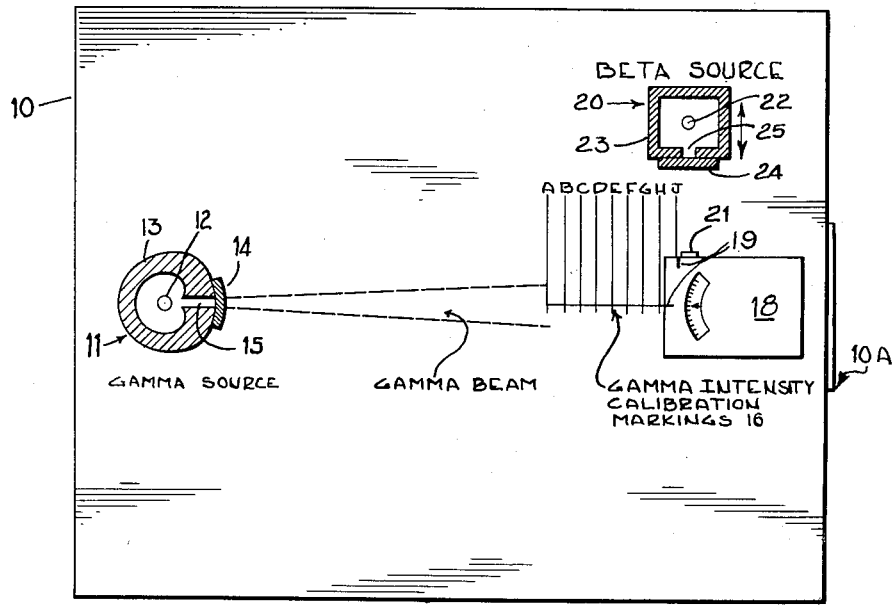

Nov. 13, 1962  E. J. DI IANNI ET AL  3,064,130
GAMMA INSTRUMENT CALIBRATION
Filed Dec. 2, 1959

COLORED OUTLINE GUIDES ON FLOOR OF CASING FOR USE IN POSITIONING THREE DIFFERENT METER TYPES

INVENTORS
ELMO J. DI IANNI
FRED C. RIGGIN
BY Max D. Farmer
ATTORNEYS

3,064,130
GAMMA INSTRUMENT CALIBRATION
Elmo J. Di Ianni, 247 Schenck Blvd., Floral Park, N.Y., and Fred C. Riggin, 691 E. 39th St., Brooklyn 3, N.Y.
Filed Dec. 2, 1959, Ser. No. 856,881
7 Claims. (Cl. 250—83.3)
(Granted under Title 35, U.S. Code (1952), sec. 266)

The invention described herein may be manufactured and used by or for the Government of the United States of America for governmental purposes without the payment of any royalties thereon or therefor.

This invention relates to calibration of instruments for measuring intensity of gamma radiation particularly those capable of measuring intense gamma radiation.

In this description the term calibration is used in a broad sense and includes calibrating an instrument not previously calibrated, recalibrating an instrument following a repair or replacement of a battery supply, or periodically checking for and adjusting any drift in the calibration of an instrument. The instrument may include one scale or several scales. Generally, a measuring instrument for this purpose includes a separate calibration adjustment knob for each scale; an instrument with non-linear scales often has two calibration correction knobs for each scale controlling different parameters, one knob being operable for adjusting the calibration at the low end of the scale and the other knob being operable for adjusting the calibration at the high end of the scale.

One method of calibrating an instrument for measuring intensity of gamma radiation is to obtain a source of gamma radiation sufficiently intense to produce full scale deflection on the instrument and with substantial intensity to spare, calibrate the intensity source (e.g., in terms of distance to a target) whereby selected intensities of the radiation can be obtained at the target at will by adjusting the distance therebetween, expose the target, namely, the sensitive element of the measuring instrument, to selected intensities of the gamma radiation and calibrate the instrument.

Of the three types of nuclear radiations, alpha, beta and gamma, the latter has the greatest penetrating power by far. Generally, a source of gamma radiation is housed in a lead casing having a door operable remotely. The thickness of the lead shielding is directly related to the intensity of the source. A source of gamma radiation, with an intensity on the order of several hundred roentgens per hour requires several thousand pounds of lead shielding plus support members for the shielded source, plus a special room where the shielded gamma source can be stored and used safely, plus equipment for accurately adjusting the distance between the shielded source and the target over a wide range within that room. This method of gamma instrument calibration is expensive, time consuming, cumbersome and dangerous under the best conditions, namely, in a carefully designed laboratory; under more difficult conditions in the field, e.g., aboard a nuclear powered vessel, this method is impractical.

However, in the field, where one or several gamma radiation intensity measuring instruments are used for monitoring gamma radiation around a reactor, it is essential that the instruments be calibrated not only at regular intervals but also after every repair, modification, change of battery, etc. One reason is that even a small rise in the gamma radiation anywhere around the reactor may indicate the need for repairs or adjustment and to detect the change with accuracy, the gamma instrument must be accurate. Secondly, if the gamma radiation intensity increases sharply into the range of one-hundred to several hundred roentgens per hour at any location around the reactor indicating that quick repairs are needed, it is essential that the gamma radiation intensity measuring instrument indicate the radiation intensity accurately. Since the length of time that a suitably clothed repairman can remain in the area of intense gamma radiation depends upon the intensity level of prevalent gamma radiation, if the measuring instrument is inaccurate and indicates an intensity level of radiation higher than actually exists, each repairman will spend less time on the repair than the predetermined safe interval of exposure to that intensity level of gamma radiation thereby complicating the repair procedure, while if the instrument indicates an intensity level of gamma radiation lower than actually exists, the repairman will be exposed to a dosage of gamma radiation higher than a predetermined safe and tolerable intensity level. Thirdly, since gamma radiation intensity cannot be detected and measured other than by gamma measuring instruments, morale of personnel operating a reactor is in part dependent upon continuous accurate calibration of the gamma measuring instruments. Since nuclear powered vessels may stay out at sea for extended periods, morale already strained by isolation and privation can be deteriorated by any uncertainty in the accuracy of instruments that indicate the intensity of gamma radiation.

An object of this invention is to provide an improved method of calibrating instruments for measuring intensity of gamma radiation.

Figure 2:
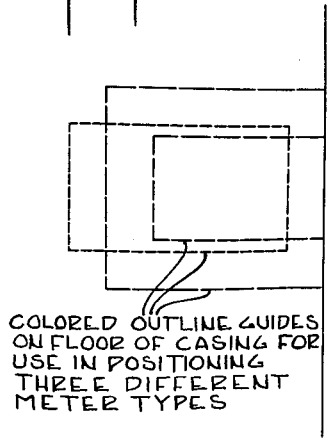
Figure 3:
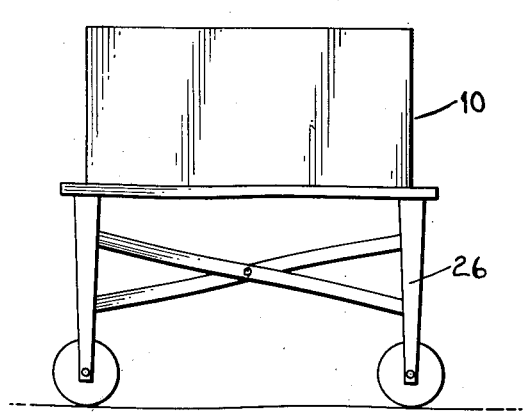

Other objects and many of the attendant advantages of this invention will be readily appreciated as the same becomes better understood by reference to the following detailed description when considered in connection with the accompanying drawings wherein:

FIG. 1 is a generally diagrammatic illustration in plan of a box with cover removed including therein a gamma source, a beta source, and an instrument being calibrated, FIG. 2 illustrates a modification of the arrangement shown in FIG. 1, wherein meter outlines are used instead of calibration markings, and FIG. 3 is a diagrammatic illustration of the calibration equipment to indicate the order of size of the equipment and its portability.

This invention is applicable only to instruments for measuring intensity of gamma radiation and having sensitive elements that are responsive to beta radiation as well as to gamma radiation but which normally includes a plug-like shield for blocking beta radiation from reaching the sensitive element of the instrument. Gamma radiation and beta radiation are additive in their effect on this type of instrument in that the indication provided by the instrument in response to concurrent beta and gamma radiation is equal to the sum of the indications obtained when the instrument is exposed to the beta and gamma radiation separately. In other words, a selected intensity level of gamma radiation produces a particular intensity indication on the gamma instrument; then if the gamma radiation is removed and the beta shield plug of the instrument is removed and a source of beta radiation is adjusted to produce the same intensity indication on the instrument, if the previous gamma radiation intensity is reestablished in coincidence with the beta radiation, the instrument will indicate the sum of the separate beta and gamma intensity indications.

There is shown in FIG. 1 a box 10 of wood, metal or other substantially rigid structural material and having a removable cover, not shown. In order that the equipment be portable, or at least readily transportable on a small cart and in order that there be sufficient space within the box for a range of radiation intensity adjustment at the meter to be calibrated, a suitable size box is one that is on the order of two feet long, one and one-half feet wide and one foot high. Fixedly mounted in the box 10 near one end is a gamma source 11, comprising a gamma radiation emitter 12, a gamma shield housing 13, a selectively removable closure shield 14 at the outer end of a narrow passage 15 which extends through the wall of the housing 13; the narrow passage 15 is made long enough to collimate into a narrow angle beam that portion of the gamma radiation from the emitter 12 that issues from the passage 15. A gamma shield 10A is secured to the end of the box opposite the gamma source 11. Because the beam is collimated and because the shield 10A intercepts the beam and blocks its passage through the opposite end of the box, the equipment may be used with reasonable safety provided one excerises care and does not intercept the beam with his hand or other body portion. A suitable gamma emitter 12 for providing on the order of several roentgens per hours at the meter to be tested may be an encapsulated needle of cobalt 60. The shield housing 13 and removable shield 14 together may weigh on the order of 20–50 pounds and may have outside dimensions on the order of six inches. Design details of the housing 13 and movable shield 14 and the mechanical expedients for enabling moving the shield between open and closed positions are not part of this invention; housings for nuclear radiation emitters are well known in the art. Gamma intensity calibration markings 16 inscribed on the floor of the box are determined under laboratory conditions and indicate the gamma intensity available at various distances from the source 12, when the shield 14 on the housing 13 is in open position. Because the radiation intensity varies as the square of the distance from the emitter, if the box is made much smaller than indicated, bringing the emitter and meter to be calibrated much closer together than indicated by the suggested measurements, even small incidental variations in distance between the meter to be tested and the emitter may produce substantial error in calibration.

It is not absolutely essential that the gamma source be fixed to the box 10 since it is possible to vary the gamma intensity by adjusting the position of the source 13. However, greater safety and accuracy is achieved if source 11 is fixed. A center-line 17 is marked on the floor of the box 10. A meter 18 to be calibrated is disposed in the box at the end opposite the gamma source and oriented so that the sensitive element (e. g., G–M tube) is closer to the gamma source. Preferably, the meter 18 has been inscribed earlier with markings 19 to aid in locating the meter in the box whereby its sensitive element is exposed to a predetermined gamma radiation intensity when the shield 14 is removed from the housing 13 of the gamma source. However, lacking markings on the meter one knowledgeable in the construction and operation of the meter may be able to locate the meter so that the sensitive element is exposed to the selected intensity. In FIG. 2, there is shown an alternate marking arrangement for locating a meter in the proper position in the box 10. Outlines of several selected known meters to be calibrated in accordance with this description are inscribed on the floor of the box 10 and the respective gamma intensity is inscribed somewhere on the housing.

A beta source 20 is disposed in box 10 laterally of the beta shield plug 21 in the meter 18. The beta source 20 includes a beta emitter 22, a beta shield housing 23, a selectively removable closure shield 24 at the outer side of a passage 25 which extends through the wall of the housing 23. The beta source may be a combination of strontium-90 and yttrium-90. Though the beta source showing on the drawing is suitable from the practical viewpoint it is exaggerated for purposes of illustration. It may weigh only ounces and may be far smaller than the gamma source 11 and still be capable of producing maximum registration on a gamma meter than measures up to several hundred roentgens. For example, the beta emitter may be housed in a small can be stainless steel less than one inch in the largest dimension, about one-eighth to one-quarter inch wide and where the steel is on the order of one-sixteenth inch thick. The emitter may be supported on the surface of a suitable embedding compound inside the can and the can may have a small orifice contiguous the emitter. To close the opening in the can, the latter may be provided with a removable cover of the same material as the can. The beta source is selectively adjustable toward and away from the meter 18 and then fixedly positioned by any suitable adjustable mounting, not shown.

The complete equipment may be supported on a kitchen size cart 26 as shown in FIG. 3. To utilize the calibration equipment shown in FIG. 1, the lid, not shown, on box 10 is moved to open position and the meter to be calibrated carefully arranged in a position in the box for exposure to a predetermined intensity of gamma radiation, guided by markings as shown in FIG. 1 or FIG. 2. The gamma shield 14 and the beta shield 24 block radiation from the respective emitters until the shields are moved to open position. It is assumed for purposes of this discussion that the meter 18 has several scales with a calibration adjustment knob for each scale and that the selected gamma intensity occurs intermediate the limits of the lowest scale and that successive multiples thereof appear intermediate the limits of the successively higher scales. When the meter is in the selected position, and the lowest scale is switched in, the shield 14 is moved to open position, care being exercised to avoid exposure to the gamma beam within the box 10. While the shield 14 is in open position the meter 18 is read. The shield 14 is moved to closed position. If the meter indication did not agree with the known gamma intensity, the meter is adjusted. After the adjustment, the shield 14 is opened and the meter is checked; a second adjustment is made if necessary. Then the gamma shield 14 is closed, the beta shield plug 21 of the meter is removed and the beta shield 14 is opened; the beta source is moved to a position where the same indication is obtained on the meter as was obtained when exposed to the gamma radiation. Then, the next higher scale of the meter 18 is switched in. The gamma shield is moved to open position and the meter is read. The gamma shield is returned to closed position. If there is a discrepancy between the meter indication and twice the intensity of the aforesaid gamma radiation, the second scale is adjusted in the same manner as was the first scale. Then the beta source is adjusted to produce the same indication on the meter as before the gamma shield was returned to closed position. The next scale of the meter is switched in and the gamma shield is again moved to open position. The above procedure is continued until every scale of the meter is adjusted. Then the beta shield 24 and the beta shield plug 21 are returned to their closed positions respectively.

A meter not previously calibrated or one whose calibration is so much changed due to repairs that it cannot be adjusted may be calibrated by this method provided that the gamma intensity selected at the meter causes only a small percentage deflection on the meter so that the meter may be calibrated at a reasonable number of points over the scale with the combination of gamma and beta sources. The steps are the same as described above except that at each point instead of making a meter adjustment the meter is marked or the extent of the deflection is recorded on a data sheet for later marking.

The reason that beta radiation can simulate the effect of gamma radiation about one hundred times as intense in a meter that is sensitive to both beta and gamma stems from the fact that while each beta particle from a beta emitter entering the sensitive element of the meter will probably produce a count, the statistical probability of any one unit of gamma radiation from a gamma emitter entering the sensitive element of the meter and producing a count is about one percent of the statistical probability of a beta particle producing a count.

This invention combines a small gamma source and a small beta source in a novel way for meter calibration purposes. The need for a large, heavy, expensive and dangerous gamma source and the complex support and housing therefor, for use in calibration of gamma instruments is precluded by this invention. Furthermore, the calibration equipment can be readily used in the field, e.g., aboard ship, and safely, to calibrate instruments that measure on the order of several hundred roentgens gamma radiation.

Obviously many modifications and variations of the present invention are possible in the light of the above teachings. It is therefore to be understood that within the scope of the appended claims the invention may be practiced otherwise than as specifically described.

We claim:

1. Portable apparatus for use in the field as for example aboard nuclear powered vessels for calibrating an extended range gamma radiation intensity measuring instrument of the type that is many times more sensitive to beta radiation than to gamma radiation and includes a removable beta shield for normally blocking beta radiation from the sensitive element of the instrument and which has a particular measurement range for gamma radiation intensity which comprises, a cabinet for supporting therein said measuring instrument with its sensitive element in a selected position in said cabinet, a comparatively low intensity source of gamma radiation secured within said cabinet and including a gamma shield selectively movable between open and closed positions and when in open position said source provides at selected times a collimated beam of gamma radiation directed toward said selected position for providing at the selected position a predetermined intensity of gamma radiation that is less than the intensity corresponding to the center of the measurement range of the instrument, a source of beta radiation having a beta shield selectively movable to open or closed position thereon; mounted in said cabinet near said selected position and adjustable toward and away from said selected position and capable of providing to the sensitive element of the instrument at that position a beta radiation intensity that produces at least the same response in the measuring instrument as does said predetermined intensity of gamma radiation, whereby when the sensitive element of said measuring instrument is in said selected position in said cabinet with its beta shield in place and is exposed to said predetermined intensity of gamma radiation it may be calibrated for said predetermined intensity of gamma radiation and then when said beta shield is removed from the instrument and the instrument is concurrently exposed to said predetermined intensity of gamma radiation and to that intensity of beta radiation which produces the same indication on the meter as said predetermined intensity gamma radiation, said instrument may be calibrated for twice said predetermined intensity of gamma radiation.

2. Apparatus as defined in claim 1 wherein said cabinet is provided with markings to assist in locating the measuring instrument relative to said gamma radiation source for exposure to a selected one of several predetermined intensities of gamma radiation.

3. Apparatus as defined in claim 1 wherein said source of beta radiation is position adjustable over a range for producing not only the same response in the measuring instrument as said predetermined intensity of gamma radiation but also to provide selectively one of several multiples thereof to enable calibration of the instrument at several points over the extended range of the instrument.

4. Apparatus as defined in claim 1 wherein said cabinet includes a gamma shield at one end thereof in the path of the gamma radiation to enable one to stand at that end of the cabinet and observe the measuring instrument without danger from the gamma radiation.

5. Apparatus as defined in claim 2 wherein said source of gamma radiation is capable of providing at the positions corresponding to said markings gamma radiation intensities ranging from a fraction of a roentgen to several roentgens and wherein said source of beta radiation has sufficient intensity and is position adjustable over a sufficient range for producing not only the same response in the measuring instrument as is producible by the gamma radiation from said gamma source at a selected marking but also is capable of providing selectively multiples of that response up to the equivalent of several hundred roentgens of gamma radiation.

6. An improved method of calibrating at at least two levels within its range, a gamma radiation measuring instrument of the type which also is sensitive to beta radiation, and which has a removable beta shield for normally blocking beta radiation from the sensitive element of the instrument, which comprises establishing at the sensitive element of the instrument a predetermined intensity of gamma radiation which intensity is less than half the intensity which produces full scale response, then calibrating the instrument for said predetermined intensity of gamma radiation, then disestablishing said gamma radiation at said instrument removing said beta shield and establishing at the sensitive element of said instrument that intensity of beta radiation which causes the instrument to afford an indication identical to the indication afforded thereby just prior to disestablishment of said predetermined intensity of gamma radiation, then without changing the intensity of the beta radiation at said element of said instrument reestablishing said predetermined intensity of gamma radiation at the sensitive element of said instrument, and then calibrating said instrument for twice said predetermined intensity of gamma radiation, whereby the gamma radiation instrument may be calibrated with a smaller, lighter weight, less cumbersome source of the gamma radiation and with less danger to the person calibrating the instrument.

7. The method as defined in claim 6, wherein said predetermined intensity of gamma radiation is a small fraction of that intensity which produces full scale response and wherein said instrument is calibrated at a plurality of points corresponding to integral multiples of said intensity of gamma radiation by successively calibrating and stepping up the beta radiation by amounts for producing the same response as that produced by said predetermined intensity of gamma radiation at the last point calibrated.

References Cited in the file of this patent

UNITED STATES PATENTS

| | | |
|---|---|---|
| 2,540,261 | Herzog | Feb. 6, 1951 |
| 2,666,857 | McLaren et al. | Jan. 19, 1954 |
| 2,837,659 | Hendee | June 3, 1958 |
| 2,839,688 | Anton | June 17, 1958 |

OTHER REFERENCES

Nuclear Geology, 1954, page 224.